United States Patent [19]

Harris et al.

[11] Patent Number: 5,165,479
[45] Date of Patent: Nov. 24, 1992

[54] METHOD FOR STIMULATING SUBTERRANEAN FORMATIONS

[75] Inventors: Phillip C. Harris; Weldon M. Harms; Lewis R. Norman; Joe M. Sandy, all of Duncan, Okla.

[73] Assignee: Halliburton Services, Duncan, Okla.

[21] Appl. No.: 734,364

[22] Filed: Jul. 22, 1991

[51] Int. Cl.⁵ .................. E21B 43/25; E21B 43/26
[52] U.S. Cl. .................. 166/300; 166/302; 166/305.1; 166/308; 252/8.551
[58] Field of Search ............ 166/300, 302, 305.1, 166/308, 295; 252/8.551

[56] References Cited

U.S. PATENT DOCUMENTS

| | | | |
|---|---|---|---|
| 3,615,794 | 10/1971 | Nimerick | 166/295 X |
| 4,462,917 | 7/1984 | Conway | 166/308 X |
| 4,464,270 | 8/1984 | Hollenbeak et al. | 166/308 X |
| 4,477,360 | 10/1984 | Almond | 166/308 X |
| 4,514,309 | 4/1985 | Wadhwa | 166/308 X |
| 4,534,870 | 8/1985 | Williams | 166/305.1 X |
| 4,619,776 | 10/1986 | Mondshine | 166/308 X |
| 4,635,727 | 1/1987 | Anderson et al. | 166/308 |
| 4,665,987 | 5/1987 | Sandiford et al. | 166/300 X |
| 4,799,550 | 1/1989 | Harris et al. | 166/300 |
| 4,982,793 | 1/1991 | Holtmyer et al. | 166/308 X |
| 5,082,579 | 1/1992 | Dawson | 252/8.551 |

Primary Examiner—George A. Suchfield
Attorney, Agent, or Firm—Robert A. Kent

[57] ABSTRACT

The present invention provides a method of treating a subterranean formation utilizing a gelled fluid containing a galactomannan gum and a crosslinking agent comprising a source of borate ions and a delayed crosslinker comprising a source of Ti(+4) or Zr(+4) ions. The combination of crosslinking agents yields a viscous fluid at elevated temperatures having a viscosity higher than attainable by either crosslinking agent alone or as the result of the additive effects of the crosslinking agents. The enhanced viscosity facilitates transport and placement of proppant material in a subterranean formation.

18 Claims, 1 Drawing Sheet 5,165,479

METHOD FOR STIMULATING SUBTERRANEAN FORMATIONS

BACKGROUND OF THE INVENTION

1. Field Of The Invention

This invention relates to methods for stimulating subterranean formations utilizing viscous fluids to enhance production of formation fluids to enhance production of formation fluids. More particularly, the invention relates to methods of increasing the viscosity of a viscous fluid at elevated temperatures to facilitate stimulation of a subterranean formation.

2. Description Of The Prior Art

Hydraulic fracturing is a widely used technique for stimulating the production of fluids, such as petroleum, from subterranean formations. Fracturing is commonly performed by contacting a subterranean formation with a viscous fracturing fluid that may contain particulate solids, hereinafter referred to as propping agents or proppant suspended therein. Sufficient pressure is applied to the fracturing fluid by surface pumping equipment to cause the opening of a fracture in the subterranean formation by the transmitted pressure. The elevated pressure is maintained on the fluid for a sufficient time to cause the fracture to extend into the subterranean formation by movement of the fluid into the fracture. When the pressure on the fracturing fluid is reduced, the propping agents in the fluid prevent the complete closure of the created fracture.

Viscous fluids are desirably used as fracturing fluids because they have been found to remain in the fractures, through build-up of a filter cake of the fracture faces, for a sufficient time to permit satisfactory extension of a fracture into a subterranean formation. Additionally a viscous fracturing fluid facilitates the transport of a propping agent into the created fracture.

A significant problem is encountered where the bottom hole temperature or the temperature in the vicinity or locus of the fracture exceeds about 175° F.–200° F. At such elevated temperatures, many types of viscous fluids undergo a reduction in viscosity and therefore a reduction in their fracturing capability.

It would be desirable to provide a viscous fluid that is capable of readily transporting proppant at ambient temperatures yet develops sufficient viscosity to satisfactorily fracture a formation having a temperature in excess of about 175° F.

SUMMARY OF THE INVENTION

The present invention concerns a method of treating a subterranean formation, such as, for example, to aid in recovering petroleum fluids therefrom. In the process, a source of borate is utilized to crosslink a gel and provide higher initial viscosity to a solution of a galactomannan gum which also contains a delayed crosslinker comprising a source of titanium or zirconium ions. The delayed crosslinker provides a means by which the viscosity may be further enhanced at elevated temperatures. Surprisingly, the use of the borate crosslinker in combination with the delayed titanium or zirconium crosslinker yields a viscous fluid with a higher viscosity at elevated temperatures than either constituent alone or as the result of the additive effects of the two crosslinkers. The enhanced viscosity of the fluid facilitates transport and placement of a proppant within fractures created in a subterranean formation.

DETAILED DESCRIPTION OF THE INVENTION

Figure 1:
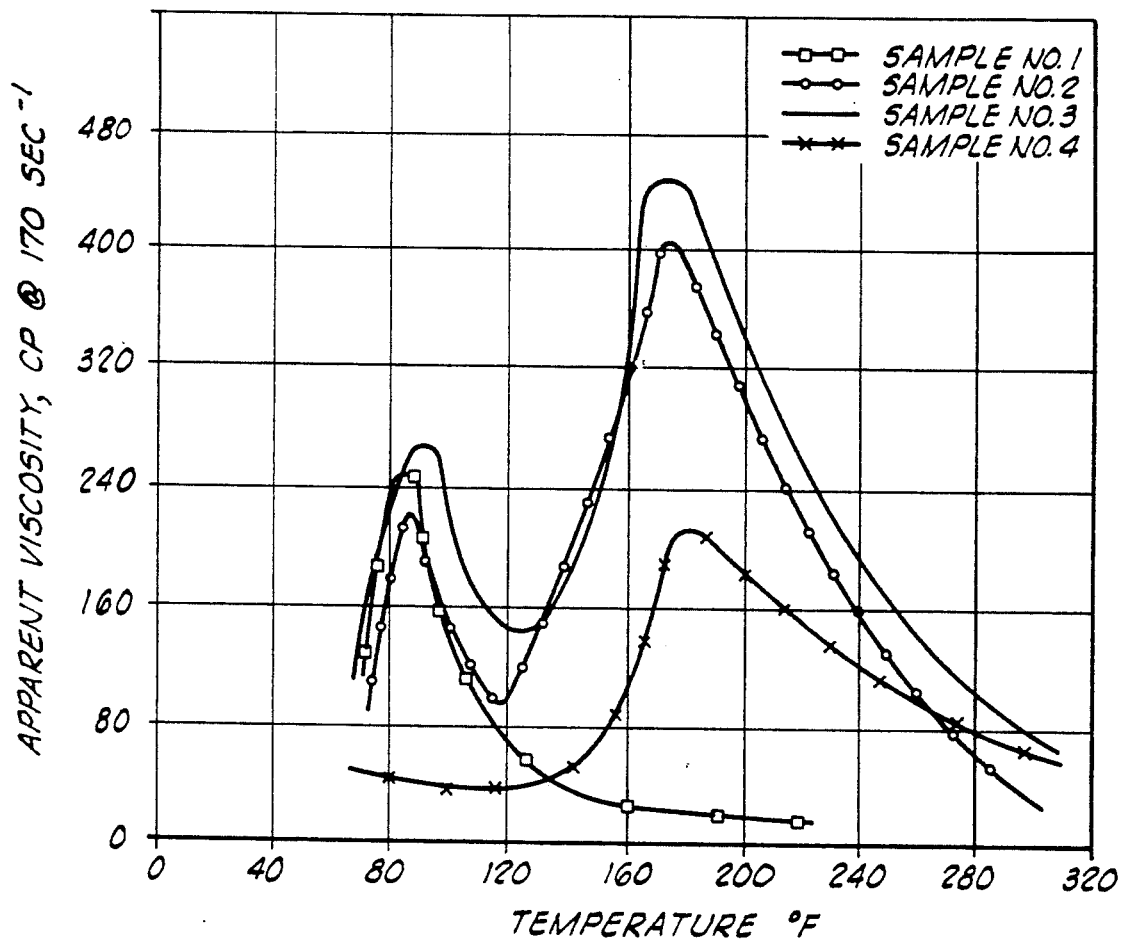
FIG. 1 is a graph of temperature versus apparent viscosity for aqueous gel fluids of the present invention in comparison to gels containing individual crosslinking agent constituents.

In the practice of the present invention, a galactomannan gel is prepared by hydrating the gelling agent in an aqueous fluid under suitable conditions to hydrate the gum. A borate crosslinking agent together with a delayed titanium or zirconium-ion crosslinking agent and a suitable base, then are admixed with the gel. The borate source causes the gel to crosslink to provide increased initial viscosity to the gel at temperatures near ambient temperature. Upon introduction into a subterranean formation and heating, the delayed crosslinker provides further viscosity to the fluid, thereby facilitating placement of a proppant in a fracture created in a subterranean formation.

The galactomannan gums used as gelling agents in the present invention are those natural gums, derivatives and modifications of galactomannan gums which are characterized as containing a backbone consisting essentially of mannose units having various amounts of galactose units attached to the linear backbone formed by the mannose units. The gums also may be characterized as having one or more cis-hydroxyl, hydroxyl, carboxyl, sulfate, sulfonate, amino or amide groups. Many of the useful commercial forms of these gums comprise a mixture of polymeric units containing different chain lengths and different ratios of galactose units to mannose units. Typical of natural galactomannans which can be employed in the practice of the present invention are guar gum, locust bean gum, tara and other gums derived from endosperm seeds and the like. Various modifications and derivatives of galactomannans which are useful include, for example, hydroxyalkyl galactomannans, carboxyalkyl galactomannans, hydroxyalkyl carboxyalkyl galactomannans and the like. Specific derivatives which may be employed in the practice of the present invention include, for example, hydroxypropyl guar, hydroxyethyl guar, carboxymethyl hydroxyethyl guar, carboxymethyl hydroxypropyl guar and similar water soluble or dispersible derivatives known in the art.

The aqueous fluid utilized to hydrate the galactomannan can comprise substantially any aqueous fluid. Preferably, the aqueous fluid comprises either fresh water or a salt solution such as 2% Kcl in fresh water.

It is well known that galactomannan gums generally hydrate most rapidly in an aqueous fluid which has a pH value within the range of from about neutral to slightly acidic. Each type of gum may have a different optimum pH wherein the hydration occurs most rapidly It is therefore preferred that a buffer be utilized to adjust the initial pH of the fluid into which the gum is dispersed to a value within the preferred range. Simple laboratory tests well known to those skilled in the art can be utilized to determine the particular pH range for a particular galactomannan. Suitable buffers include, for example, mixtures of a salt of a weak acid and an organic acid such as sodium carbonate and fumaric acid, sodium acetate and fumaric acid, ammonium acetate and acetic acid, sodium citrate and citric acid and the like. The ratio of the salt and acid in the buffer can be varied to provide the desired buffered pH.

It is also known that different gums may require different periods of time to hydrate sufficiently to be effectively crosslinked. The hydration time may be adjusted from a few seconds to several hours as required to effectively crosslink the gum. To facilitate hydration of the gum and minimize lumping upon contact with the aqueous fluid, the gum may be coated with various well known inhibitors such as glyoxal, borate or the like that are applied by manufactures of the gums as a part of the manufacturing process. The inhibitors regulate the hydration rate of the gum upon initial contact with an aqueous fluid to minimize lumping or the creation of fish eyes or gel balls in the viscous fluid. Alternatively, the gum may be admixed with a hydrocarbon to form a slurry in which case no inhibitors are necessary. The slurry then may be introduced directly into contact with an aqueous fluid during the admixing process without lumping of the gum occurring.

Generally, the gelling agent is present in an amount of from about 20 to 100 pounds per 1000 gallons of aqueous fluid. The exact amount depends upon the precise gum employed, the desired viscosity, the formation temperature and other well known parameters which effect such limits such as the salt content of the fluid.

Borate ion releasing compounds which can be employed in the present invention include, for example, any boron compound which will supply borate ions in an aqueous fluid, for example, boric acid, sodium diborate, sodium tetraborate, pentaborates polymeric compounds such as Polybor ®, a polymeric compound of boric acid and an alkali borate and the like. The borate ion also may be supplied from the surface treatment if a borate treatment was utilized by the manufacturer to minimize lumping of the gelling agent material.

Delayed crosslinking agents containing zirconium which are useful in accordance with this invention are zirconium IV containing compounds which are soluble in the aqueous fluid or gel and which are capable of forming a crosslinked structure with the gelling agent used. Compounds which supply zirconium IV ions are, for example, zirconium lactate, zirconium carbonate, zirconium acetylacetonate, zirconium triethanolamine, zirconium diisopropylamine lactate and polyhydroxy complexes of zirconium and the like. Delayed crosslinkers of the type disclosed in U.S. Pat. Nos. 4,477,360 and 4,799,550, the entire disclosures of which are incorporated herein, also may be used. The zirconium containing compound is admixed with the aqueous fluid after adjustment of the pH to the slightly alkaline range. The alkaline pH of the fluid delays the crosslinking of the zirconium containing compound until the fluid is heated. Upon heating to a temperature above about 175° F., the zirconium containing compound begins to rapidly interact with the aqueous gel to further crosslink the gel. The admixing of the delayed crosslinking agent may be performed within any conventional mixing apparatus or it may occur by injection into a stream of the gelled fluid during pumping which generally is referred to as "on the fly" by those skilled in the art. The zirconium containing compound preferably comprises zirconium lactate because of its availability and economy. The zirconium containing compound is admixed with the gelled fluid in an amount sufficient to provide zirconium ions in the plus 4 oxidation state in an amount in the range of from about 0.05 to about 0.8 percent by weight of the gelling agent utilized. The rate of the zirconium ion crosslinking reaction, or the extent of delay, can be adjusted based upon the temperature to which the fluid will be heated by varying the pH level of the aqueous gel within the alkaline range.

Delayed crosslinking agents containing titanium which are useful in accordance with this invention are titanium IV containing compounds which are soluble in the aqueous fluid or gel and which are capable of forming a crosslinked structure with the gelling agent used. Compounds which supply titanium IV ions are, for example, titanium ammonium lactate, titanium triethanolamine, titanium acetylacetonate, polyhydroxy complexes of titanium and the like. Delayed crosslinkers of the type disclosed in U.S. Pat. Nos. 4,462,917 and 4,464,270, the entire disclosures of which are incorporated herein, also may be use. The titanium containing compound is preferably admixed with the aqueous fluid after adjustment of the pH to the slightly alkaline range upon hydration of the gelling agent. The alkaline pH assists in delaying the crosslinking of the gelling agent by the titanium IV ions. The titanium compound may be introduced into the fluid in the manner described hereinbefore for zirconium containing compounds. The titanium containing compound is admixed with the gelled fluid in an amount sufficient to provide titanium ions in the plus 4 oxidation state in an amount in the range of from about 0.05 to about 0.8 percent by weight of the gelling agent utilized.

Conventional propping agents c⁻ ı be employed with the fluid compositions of the present invention, such as, for example, sand, resin coated sand, sintered bauxite, various ceramic compounds, glass beads and the like. Propping agents generally are used in concentrations in the range of from about 1 to about 24 pounds per gallon of the aqueous fluid; however, higher or lower concentrations can be used as required. The particular size of the propping agent employed is a function of the formation to be stimulated, the pumping fluid rates as well as other known factors. However, particle sizes generally are in the range of from about 2-200 mesh on the U.S. Sieve Series scale.

The gelled fluid also may contain other additives such as, for example, clay control agents bacteriacides, breakers, fluid loss additives, stabilizers surfactants and the like which do not detrimentally react with the other constituents to prevent the formation of the desired crosslinked gel structure.

Each of the constituents of the present invention may be employed in widely varying amounts. The amount of each is dependent both on the quantity of the other constituents and also upon the desired characteristics of the aqueous gelled fluid.

To further illustrate the present invention, and not by way of limitation, the following example is provided.

EXAMPLE

A base gel was prepared by hydrating 40 lbs/1000 gallons of fluid of hydroxypropyl guar in deionized water containing 2.7% $KNO_3$ and 0.5 gallons/1000 gallons of fluid of a 1:1 admixture by weight of ammonium acetate and acetic acid. Upon hydration of the gelling agent, 10 lbs/1000 gallons of fluid of sodium carbonate was added to the gel. Thereafter samples were admixed with varying quantities of Polybor ®, a product of U.S. Borax Chemical Corp., Los Angeles, Calif. and a hydroxy complex of zirconium as indicated in the table below. The individual samples of hydrated gel were individually pumped into a flow loop viscometer maintained at 1000 psi and recirculated at 1100 sec$^{-1}$. The crosslinking agents were added to the gel within the viscometer, heating began and the shear rate dropped to 170 sec$^{-1}$. The initial and final pH of the fluids were measured and the apparent viscosity was measured over a temperature range of from 70° F. to 300° F. as the fluid was circulated in a recirculating flow loop viscometer. The apparent viscosity data is set forth in FIG. 1. Tests 3 and 4 included 30 lbs/1000 gal of fluid of sodium thiosulfate to stabilize the gel.

TABLE

| Test Sample No. | Crosslinker | lb/1000 gal Fluid | Initial pH | Final pH |
| --- | --- | --- | --- | --- |
| 1 | Polybor ® | 2.7 | 9.81 | 9.08 |
| 2 | Polybor ® | 2.7 | 9.08 | 9.12 |
|   | Zr + 4 ions | 0.04 |   |   |
| 3 | Polybor ® | 2.7 | 9.78 | 9.13 |
|   | Zr + 4 ions | 0.04 |   |   |
| 4 | Zr + 4 ions | 0.04 | 9.75 | 9.58 |

Tests 2 and 3 illustrated in FIG. 1 which correspond to the present invention clearly demonstrate the superior viscosity development achieved by the method of the present invention in comparison to the individual constituents.

While preferred embodiments of the invention have been described herein, changes or modifications can be made in the method by an individual skilled in the art without departing from the spirit or scope of the invention as set forth in the appended claims.

What is claimed is:

1. A method of treating a subterranean formation comprising:
    providing a gelling agent comprising an at least partially hydrated galactomannan gum in an aqueous fluid having an alkaline pH whereby said fluid is gelled to which a crosslinking agent comprising a source of borate has been added together with another crosslinking agent having a delayed crosslinking activity comprising a source of zirconium IV ions, said crosslinking agents being present in an amount sufficient to effect crosslinking of said gum in said gel; and
    introducing said gel into contact with a subterranean formation at a rate and pressure sufficient to achieve treating of said subterranean formation.

2. The method of claim 1 wherein said rate and pressure are sufficient to fracture said formation and propagate said fracture within said formation.

3. The method of claim 2 wherein said gelled fluid also includes a propping agent.

4. The method of claim 3 wherein said propping agent is present in an amount of from about 1 to about 24 pounds per gallon of aqueous fluid.

5. The method of claim 1 wherein said borate source comprises at least one member selected from the group consisting of boric acid, sodium tetraborate and polymeric borate compounds and said delayed crosslinking agent comprises at least one member selected from the group consisting of zirconium lactate, zirconium triethanolamine and polyhydroxy complexes of zirconium.

6. The method of claim 1 wherein said gum is present in an amount of from about 20 to about 100 pounds per 1000 gallons of aqueous fluid.

7. The method of claim 1 wherein said borate source is present in an amount sufficient to provide a borate ion concentration of from about 2 to about 20 percent by weight of the gelling agent.

8. The method of claim 1 wherein said zirconium IV ion source is present in an amount sufficient to provide a Zr(+4) concentration of from about 0.05 to about 0.8 percent by weight of said gelling agent.

9. A method of fracturing a subterranean formation penetrated by a wellbore comprising:
    providing an at least partially hydrated gelling agent comprising a galactomannan gum in an aqueous fluid whereby a gelled fluid is formed to which an alkaline compound and a crosslinking agent comprising a source of borate ions has been added together with a delayed crosslinking agent comprising a source of zirconium IV ions in an amount sufficient to effect desired crosslinking of said hydrated galactomannan;
    introducing said gelled aqueous fluid into said wellbore at a rate and pressure sufficient to effect fracturing of said subterranean formation; and
    fracturing said subterranean formation upon contact with said gelled aqueous fluid.

10. The method of claim 9 wherein said gelled fluid is defined further to include a propping agent.

11. The method of claim 10 wherein said propping agent is present in an amount of from about 1 to about 24 pounds per gallon of aqueous fluid.

12. The method of claim 9 wherein said borate source comprises at least one member selected from the group consisting of boric acid, sodium tetraborate and polymeric borate compounds and said delayed crosslinking agent comprises at least one member selected from the group consisting of zirconium lactate, zirconium triethanolamine and polyhydroxy complexes of zirconium.

13. The method of claim 9 wherein said gum is present in an amount of from about 20 to about 100 pounds per 1000 gallons of aqueous fluid.

14. The method of claim 9 wherein said borate source is present in an amount sufficient to provide a borate ion concentration of from about 2 to about 20 percent by weight of the gelling agent.

15. The method of claim 9 wherein said zirconium IV ion source is present in an amount sufficient to provide a Zr(+4) concentration of from about 0.05 to about 0.8 percent by weight of said gelling agent.

16. A method of treating a subterranean formation penetrated by a wellbore comprising:
    providing a gelled aqueous fluid viscosified by at least partial hydration of a gelling agent comprising a galactomannan gum;
    adjusting the pH of said gelled fluid to an alkaline pH by the addition of a sufficient quantity of an alkaline compound to raise said pH to an alkaline value above about 8;
    admixing a crosslinking agent with said gelled aqueous fluid, said crosslinking agent comprising a borate ion releasing compound present in an amount sufficient to provide a borate concentration of from about 2 to about 20 percent by weight of said gelling agent whereby said gelled fluid is caused to be crosslinked upon alkaline adjustment of the solution pH;
    admixing a delayed crosslinking agent with said alkaline pH adjusted gelled fluid, said delayed crosslinking agent comprising at least one compound capable of providing Zr(+4) ions in solution in the aqueous fluid, said compound being present in an amount sufficient to provide a Zr(+4) ion concentration of from about 0.05 to about 0.8 percent by weight of said gelling agent;

introducing the crosslinked gelled fluid into a wellbore penetrating a subterranean formation;

heating said crosslinked gelled fluid to a temperature above about 175° F. whereby said delayed crosslinking agent is caused to initiate significant additional crosslinking of said gelled fluid; and treating said subterranean formation by contact with said heated crosslinked gelled fluid introduced through said wellbore.

17. The method of claim 16 wherein said treating is effected at a rate and pressure sufficient to fracture said subterranean formation.

18. The method of claim 16 wherein said gelled aqueous fluid also includes a propping agent.

* * * * *